United States Patent
Bandaru et al.

(10) Patent No.: US 8,344,676 B2
(45) Date of Patent: Jan. 1, 2013

(54) SEAL LEAKAGE AND SEAL OIL CONTAMINATION DETECTION IN GENERATOR

(75) Inventors: Vinodh Kumar Bandaru, Bangalore (IN); Jeffrey James Andritz, Altamont, NY (US); James Daniel Antalek, Valatie, NY (US); Krishna Swamy Cherukuri, Bangalore (IN); Daniel James Fitzmorris, Clifton Park, NY (US); Anthony James George, Clifton Park, NY (US); Nicola Piccirillo, Scotia, NY (US); Sudhanshu Rai, Ghazipur (IN)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 12/817,260

(22) Filed: Jun. 17, 2010

(65) Prior Publication Data

US 2011/0309780 A1  Dec. 22, 2011

(51) Int. Cl.
  *G01R 31/02* (2006.01)
(52) U.S. Cl. .............................. 318/490; 310/53; 310/59
(58) Field of Classification Search .................. 318/490; 310/53, 59, 61
See application file for complete search history.

(56) References Cited

U.S. PATENT DOCUMENTS

| | | | |
|---|---|---|---|
| 3,258,619 A | 6/1966 | Davidson | |
| 4,792,911 A | 12/1988 | Gonzalez et al. | |
| 5,412,977 A | 5/1995 | Schmohl et al. | |
| 5,492,004 A | 2/1996 | Berg et al. | |
| 6,626,436 B2 | 9/2003 | Pecht et al. | |
| 2011/0101801 A1* | 5/2011 | Hattori et al. | 310/53 |

FOREIGN PATENT DOCUMENTS

| | | |
|---|---|---|
| GB | 1362924 A | 8/1974 |
| GB | 2460745 A | 12/2009 |
| JP | 60-66644 A | 4/1985 |
| KR | 1020050008924 A | 1/2005 |

OTHER PUBLICATIONS

Search Report from corresponding GB Application No. GB1109857.1, claims 16 to 19, dated Sep. 23, 2011.
Search Report from corresponding GB Application No. GB1109857.1, claims 8 to 15, dated Sep. 23, 2011.

* cited by examiner

*Primary Examiner* — Karen Masih
(74) *Attorney, Agent, or Firm* — Hoffman Warnick LLC; Ernest G. Cusick

(57) ABSTRACT

Detection of, among other things, seal leakage(s) and/or seal oil contamination for a gas cooled generator are provided. Detectors according to some embodiments of the invention provide mechanisms of early detection of cooling gas, e.g., hydrogen, leakage through leakage sources as well as low purity and high cooling gas consumption problems in a gas cooled generator.

19 Claims, 4 Drawing Sheets

SEAL LEAKAGE AND SEAL OIL CONTAMINATION DETECTION IN GENERATOR

BACKGROUND OF THE INVENTION

The disclosure relates generally to gas cooled generators, and more particularly, to detectors for detecting, among other things, seal leakage or seal oil contamination in a gas cooled generator.

Electric generators having higher ratings are often cooled using pressurized gas, e.g., hydrogen, as the coolant. The casing of the generator contains the cooling gas, and the rotor shaft extends through the gas tight enclosure of the casing. The higher the hydrogen purity within the casing, typically, the more efficient the generator operates. Conversely, high hydrogen consumption and low hydrogen purities within the generator present problems that may lead to forced outages. Two causes of high hydrogen consumption include static seal leakage within the casing and shaft seal leakage.

Leakage of hydrogen cooling gas from the static seals within the casing is a common occurrence over time. For example, potential areas of leakage in the casing may include: high voltage bushings, glands, collector terminals, welded joints, end shield horizontals, vertical joints and hydrogen seal casing end shield vertical joints. Ultimately, this leads to hydrogen consumption above an acceptable limit.

A shaft seal system is positioned in end housings coupled to the casing and seals against the rotor shaft to substantially prevent escape of the cooling gas. The shaft seal system may use a pair of seal rings that envelope the shaft circumferentially. The seal system may also contain a pair of labyrinth seals. Labyrinth seals are located generally on either side of the seal rings, maintaining tight clearance with the shaft in an attempt to prevent hydrogen from entering the seal area, a cavity about the seal rings and any labyrinth seals, and leaking through the end housing. Seal oil is made to pass through the clearance between the shaft and seal rings at a pressure higher than the cooling gas pressure in the casing. Anomalies with the shaft seal system lead to significantly lower hydrogen purities than the expected levels and higher hydrogen consumption because the hydrogen escapes from the casing. In the seal area, seal oil dissolves the surrounding hydrogen and gives up the entrapped air due to the partial pressure change resulting in a decrease in the hydrogen purity levels. In order to maintain purity levels, continuous scavenging (i.e., replacement of a relatively low purity gas mixture with pure hydrogen) is performed. The normal scavenging levels, however, sometimes fail to meet purity requirements. At normal scavenging levels, even though the hydrogen consumption is within acceptable limits, it leads to lower running purity. In many cases, the scavenging levels are increased to a higher scavenge rate setting resulting in higher hydrogen consumption in an attempt to raise the hydrogen purities to normal.

In addition to the above issues, over time, shaft seal ring clearance with the rotor increases. In some instances, seal oil contamination can result, which can damage the shaft seal rings. This situation can also result in an increased seal oil flow rate either due to increased seal clearance or higher oil pressure, which reduces the gas purity in the seal areas and subsequently the casing.

BRIEF DESCRIPTION OF THE INVENTION

A first aspect of the disclosure provides a system comprising: a casing for surrounding at least a portion of a rotor, and enclosing a volume of a cooling gas thereabout, the casing including a plurality of static seals; an end housing at each end of the casing, each end housing including a seal system through which the rotor extends, wherein a portion of cooling gas escapes from the casing to at least one seal area within the end housing; a source of cooling gas fluidly coupled to the casing by a cooling gas regulator for delivering a flow of the cooling gas to the casing to maintain a substantially constant pressure in the casing; a scavenging system coupled to each end housing for removing a gas mixture including a portion of escaping cooling gas; a purity sensor for determining a purity of the cooling gas in the casing; and a static seal leak detector that generates an alarm indicative of a leak in at least one of the plurality of static seals in response to at least one of: an increase in a cooling gas flow rate in the cooling gas regulator compared to a cooling gas flow rate threshold, an increase in a purity of the cooling gas in the casing compared to a respective purity threshold, and an increase in a gas mixture flow rate in the scavenging system compared to a gas mixture flow rate threshold.

A second aspect of the disclosure provides a system comprising: a casing for surrounding at least a portion of a rotor, and enclosing a volume of a cooling gas thereabout; an end housing at each end of the casing, each end housing including a seal system through which the rotor extends, wherein a portion of cooling gas escapes from the casing to at least one seal area within the end housing; a scavenging system coupled to each end housing for removing a gas mixture including a portion of escaping cooling gas; a seal oil sensor for sensing a seal oil flow rate of a seal oil through at least one of the seal systems from the casing to a respective seal area at a pressure higher than a pressure within the casing; a temperature sensor for determining a drain temperature of the seal oil; a pressure differential sensor for determining a seal oil filter differential pressure across a seal oil filter; and a seal oil contamination detector that generates an alarm indicative of a contamination of the seal oil in response to the seal oil flow rate exceeding a seal oil flow rate threshold, the drain temperature being less than a drain temperature threshold and the seal oil filter differential pressure exceeding a seal oil filter pressure differential threshold.

A third aspect of the disclosure provides a system comprising: a casing for surrounding at least a portion of a rotor and enclosing a volume of a cooling gas thereabout; an end housing at each end of the casing, each end housing including a seal system including a shaft seal ring through which the rotor extends, wherein a portion of cooling gas escapes from the casing to at least one seal area via a respective shaft seal ring; a scavenging system coupled to each end housing for removing a gas mixture including at least a part of the portion of the escaping cooling gas, the scavenging system including a control valve system that removes the gas mixture at a first scavenge rate and at a second scavenge rate that is higher than the first scavenge rate; and a seal system clearance increase detector that generates an alarm indicative of an increased clearance in a shaft seal ring in response to a ratio of a time in which the control valve system operates at the first scavenge rate versus the second scavenge rate exceeding a scavenging rate ratio threshold.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides detection of, among other things, seal leakage(s) and/or seal oil contamination for a gas cooled generator. In this manner, detectors according to some embodiments of the invention provide early detection of cooling gas, e.g., hydrogen, leakage through leakage sources as well as low purity and high cooling gas consumption problems in a gas cooled generator.

Figure 1:
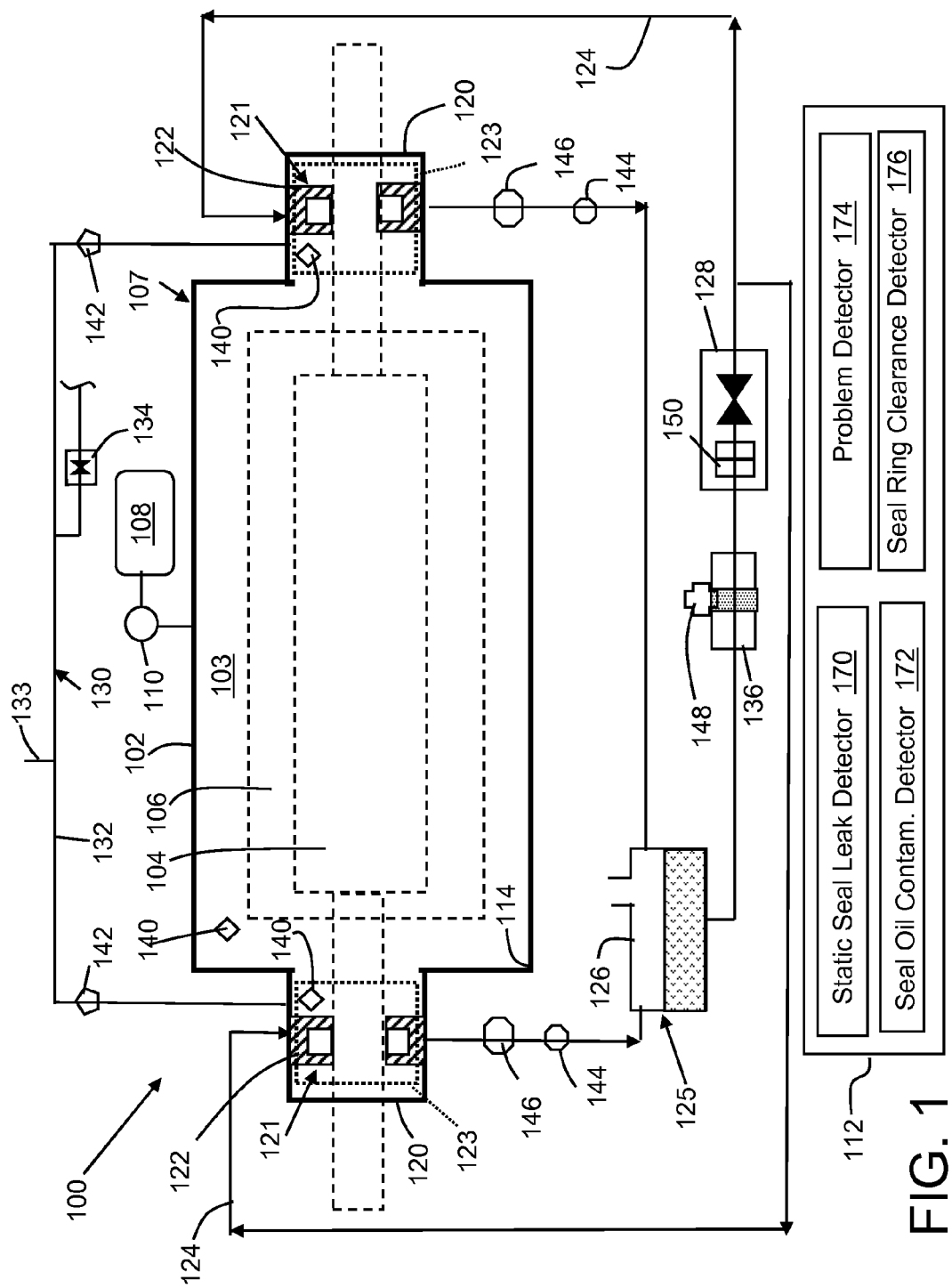
FIG. 1 shows a schematic diagram of a system according to embodiments of the invention.

Referring to FIG. 1, a system 100 according to embodiments of the invention is illustrated. System 100 includes a casing 102 for surrounding at least a portion of a rotor 104 and a stator 106 of an electric generator 107. As other operational structure of electric generator 107 is well known, no other detail of the structure will be provided other than necessary for an understanding of embodiments of the present invention. Casing 102 encloses a volume of a cooling gas 103, e.g., hydrogen, about stator 106 and rotor 104. A source of cooling gas 108 is fluidly coupled to casing 102 by a cooling gas regulator 110 for delivering a flow of the cooling gas 103 to casing 102 to maintain a substantially constant pressure in the casing. Cooling gas regulator 110 is controlled by a generator control system 112, which is described in greater detail herein. Cooling gas source 108 may include a pressurized tank(s) of cooling gas or other suitable sources of cooling gas. Although not shown, cooling gas 103 may be circulated through casing 102, parts of stator 106 and/or parts of rotor 104, and may be forcibly cooled using, e.g., a cooler.

Casing 102 may include a plurality of static seals at a number of locations at which (metal) parts of the casing mate or equipment penetrates the casing. One illustrative static seal includes a welded joint 114, e.g., at a corner of casing 102. Other examples include but are not limited to: high voltage bushings, glands, collector terminals, end shield horizontals, vertical joints and/or hydrogen seal casing end shield vertical joints. Each static seal is referred to as "static" because it does not interact with a moving part, e.g., rotor 104.

An end housing 120 is positioned at each end of casing 102. Each end housing 120 includes a seal system 122 through which rotor 104 extends. Seal system 121 is positioned in a seal area 123 in each end housing 120, i.e., each seal housing 120 includes a seal system therein. Each seal system 121 includes at least one shaft seal ring 122, which seals against rotor 104 and through which rotor 104 extends. Seal system 121 may also include, for example, a pair of labyrinth seals (not shown for clarity purposes) on either side of the seal rings to maintain a tight clearance with rotor 104 in an attempt to prevent hydrogen entering seal area 123 and leaking through end housing 120. Bearings supporting rotor 104 have been omitted for clarity. A shaft seal ring 122 may include any now known or later developed seal system that circumferentially seals, using a seal oil 124, against rotor 104. Seal oil 124 is delivered to each shaft seal ring 122 using appropriate conduits at a pressure higher than a pressure of cooling gas 103 in casing 102 to maintain a seal with rotor 104. However, a portion of cooling gas 103 escapes from casing 103 to at least one seal area 123 within end housing(s) 120. An oil recapture system 125 operates to capture seal oil 124 collecting within seal areas 123 in a seal oil tank 126, filter it using a seal oil filter 136 and return it to shaft seal rings 122 at a pressure higher than a pressure inside casing 102 using a differential pressure regulator 150. Pressure regulator 150 may be part of a control valve system 128.

A scavenging system 130 may also be coupled to each seal area 123, using appropriate conduits, for removing a gas mixture 132 including a portion of cooling gas 103 escaping into seal area(s) 123. Gas mixture 132 may also include a portion of air released from seal oil 124 (i.e., air entrapped in it). Scavenging system 130 may include a vent 133 for venting gas mixture 132 to the atmosphere. Scavenging system 130 also may include a control valve system 134 to remove gas mixture 132 at a first scavenge rate and at a second scavenge rate that is higher than the first scavenge rate. That is, control valve system 134 includes appropriate gas analyzers, pumps, regulators and valves to remove gas mixture 132 at different rates based on purity readings in seal areas 123. Control valve system 134 is controlled by control system 112. Other well known parts of scavenging system 130 have been omitted for clarity. It is emphasized that FIG. 1 is a simplified version of an electric generator 107 and that other structures such as pumps, valves, analyzers, tanks, gauges, switches, meters, traps, etc., have been omitted for clarity.

In accordance with various embodiments of the invention, a number of sensors may be employed to determine parameters that are used by a number of detectors 170, 172, 174 and 176 (shown within control system 112) to determine, among other things, seal leakage(s) and/or seal oil contamination, as will be described in greater detail herein. Each detector 170, 172, 174 and 176 may be included as part of an overall control system 112 for electric generator 107.

One sensor used by some embodiments includes a purity sensor 140 for determining a purity of the cooling gas in casing 102 and/or seal area(s) 123. As illustrated, purity sensor 140 includes three measurement locations: casing 102 and each seal area 123; however, this configuration may not be necessary in all cases. Purity sensor 140 may include any now known or later developed gas purity analyzer, and related measurement modules.

Another sensor provided in some embodiments includes a gas mixture flow rate sensor 142. Gas mixture flow rate sensor 142 measures a flow rate of gas mixture 132. Gas mixture flow rate sensor 142 may be an independent sensor positioned, e.g., in an appropriate conduit(s) of scavenging system 130, or it may be a part of control valve system 134 of scavenging system 130, i.e., such that it knows gas mixture flow rate based on, for example, pump flow rate. Gas mixture flow rate sensor 142 may include any now known or later developed gas flow rate sensor such as a rotary potentiometer, a hot wire anemometer, an orifice meter, etc. A temperature sensor 144 (e.g., in an appropriate conduit(s) of seal system 121) may also be provided in certain embodiments for determining a drain temperature of seal oil 124. Temperature sensor 144 may include any conventional sensor such as a thermocouple.

In addition, a seal oil sensor 146 may be provided (e.g., in an appropriate conduit(s) of seal system 121) to sense a seal oil flow rate of seal oil 124 through at least one of seal systems 121, i.e., by the amount of seal oil passing into conduits of recapture system 125. Seal oil 124 escapes from casing 102 to a respective seal area 123 at a pressure higher than a pressure within the casing. In another embodiment, a pressure differential sensor 148 determines a seal oil filter differential pressure across seal oil filter 136, i.e., of seal oil recapture system 125. Pressure differential sensor 148 may include any now known or later developed pressure gauge system, e.g., a piezo-resistive transducer, a diaphragm transducer, Bourdon tubes, a manometer, etc. A seal oil casing-housing differential pressure regulator 150 maintains seal oil 124 pressure higher than a cooling gas 103 pressure in casing 102 to maintain a seal with rotor 104. Regulator 150 can also, in a known fashion, provide an indication of seal oil pressure between casing 102 and seal area 123. Seal oil casing-housing differential pressure regulator 150 may include any now known or later developed pressure regulator system, e.g., a diaphragm pressure regulator, relief valves, an electronic pressure regulator, an electro-pneumatic pressure regulator, etc.

Figure 2:
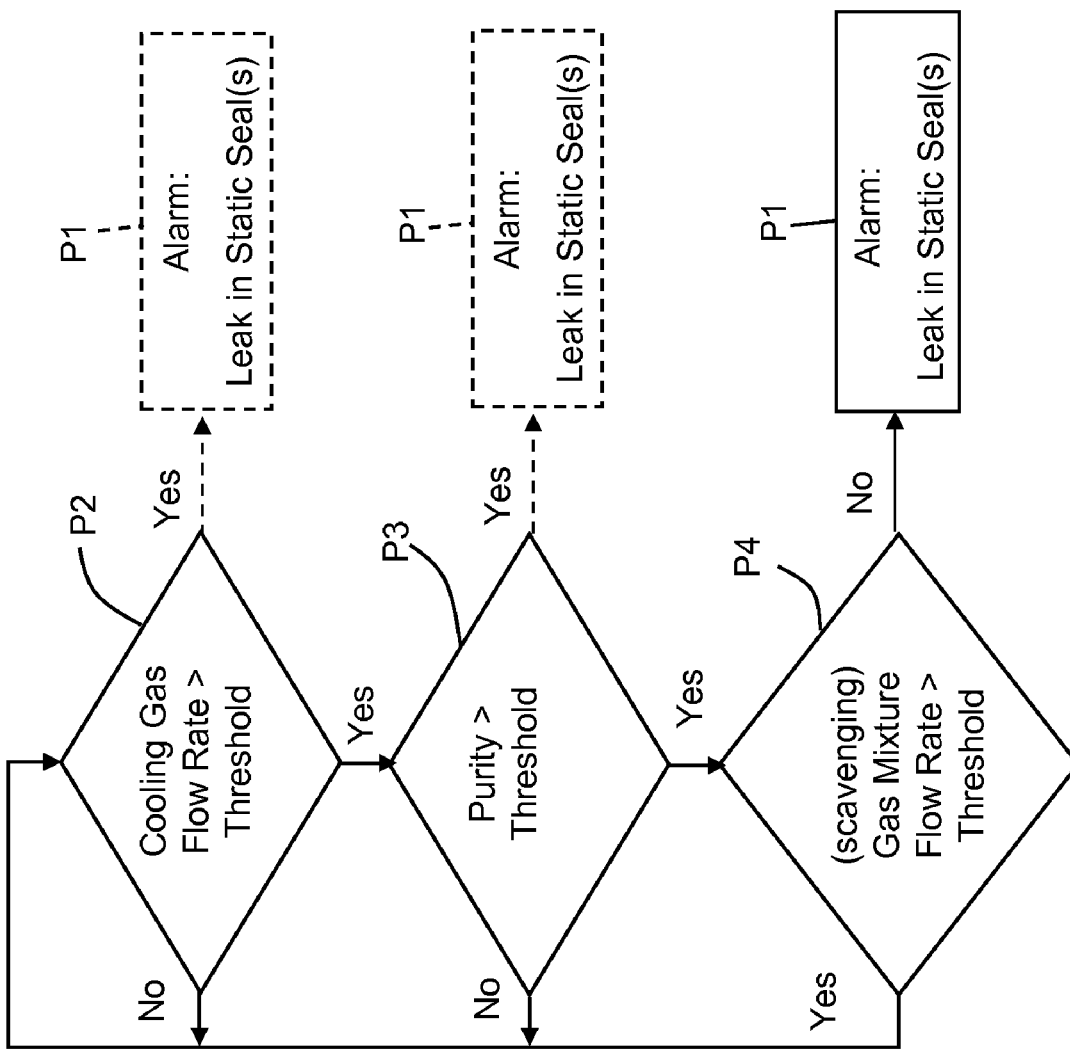
FIG. 2 shows a flow diagram of an operational methodology for a detector according to embodiments of the invention.

Turning to FIGS. 2-5, various operational embodiments of detectors 170, 172, 174, 176 will now be described. In one embodiment, a static seal leak detector 170 generates an alarm indicative of a leak in at least one of plurality of static seals 114 in casing 102. For example, a cooling gas 103 leak may occur through a high voltage bushing, glands, collector terminals, welded joints, end shield horizontals, vertical joints and hydrogen seal casing end shield vertical joints, etc. As shown in FIG. 2, static seal leak detector 170 (FIG. 1) generates the alarm (process P1) in response to at least one of: a) an increase in a cooling gas flow rate in cooling gas regulator 110 compared to a cooling gas flow rate threshold (yes at process P2), b) an increase in a purity of cooling gas 103 in casing 102, or c) an increase in a gas mixture 132 flow rate in scavenging system 130 not exceeding a scavenging flow rate threshold (no at process P4). The order of the processes may vary from that shown in FIG. 2. In FIG. 2, process P1 is shown in phantom for processes P2 and P3 because in an alternate embodiment, all of processes P2-P4 must result in a positive result in order for the alarm at process P1, i.e., an alarm occurs only when all three conditions are met, which is indicated by the 'YES' indicators on the bottom of processes P2, P3. In this case, the processes P1 shown in phantom are removed, so the 'YES' indicators on the right side of the processes P2 and P3 are removed. More specifically, in a conventional system and in system 100 as well, when a constant leak of cooling gas 103 exists through any of static seals 114 of electric generator 107, control system 112 operates to maintain a constant pressure in casing 102 by increasing the inlet flow rate of cooling gas 103 via cooling gas regulator 110. In addition, since there is essentially a replacement of gas mixture 132 with pure cooling gas 103 (e.g., hydrogen) from cooling gas source 108, a higher purity level is observed compared to the onset of the leak. So, a relatively higher value for each or both of these two parameters indicates leakage of cooling gas from one or more static seals 114. Even if the source of the leak is not constant, as is the case seen in the field, a shift in the average inlet flow rate and the casing purity will be observed. Furthermore, as noted above, gas mixture 132 flow rate is measured by gas mixture flow rate sensor 142. In this case, increased impurities as measured by purity sensor 140 in seal area(s) 123 may cause control valve system 134 to increase removal of gas mixture 132 from seal area(s) 123. Consequently, the gas mixture flow rate exceeding a respective gas mixture flow rate (scavenging rate) threshold also indicates a static seal leak. In view of the foregoing, any one or a combination of the three conditions (processes P2-P4) may indicate a static seal(s) leak.

The cooling gas flow rate threshold may be user defined, e.g., based on empirical data, and have any known units of measure. Similarly, the respective purity threshold and gas mixture flow rate thresholds may be user defined, e.g., based on empirical data, and have any known units of measure. In one embodiment, each threshold may simply be the relatively steady state value at which system 100 had been operating prior to the onset of a leak. In another embodiment, each of cooling gas flow rate, purity and gas mixture flow rate measure(s) (or any other measured values noted herein) may be configured in terms of a moving average, which may be compared to respective thresholds as such, i.e., the rates or other measured values are calculated as moving averages. The sample size taken to compute the moving averages may vary and may be evaluated to determine whether the data is reasonable, e.g., when the moving average is high continuously for N time samples, it may be established that the parameter is over the acceptable limit. As noted above, purity sensor 140 may measure purity at each location shown, in which case the purity threshold may include a value for each location, e.g., a threshold for each sensor location exists. In this case, a number of values required to exceed a respective purity threshold may be user defined, e.g., the casing purity alone, one seal area, both seal areas, all purity values, etc. Alternatively, as also noted above, the purity measurements may be combined, in which case a single purity threshold may be employed.

Figure 3:
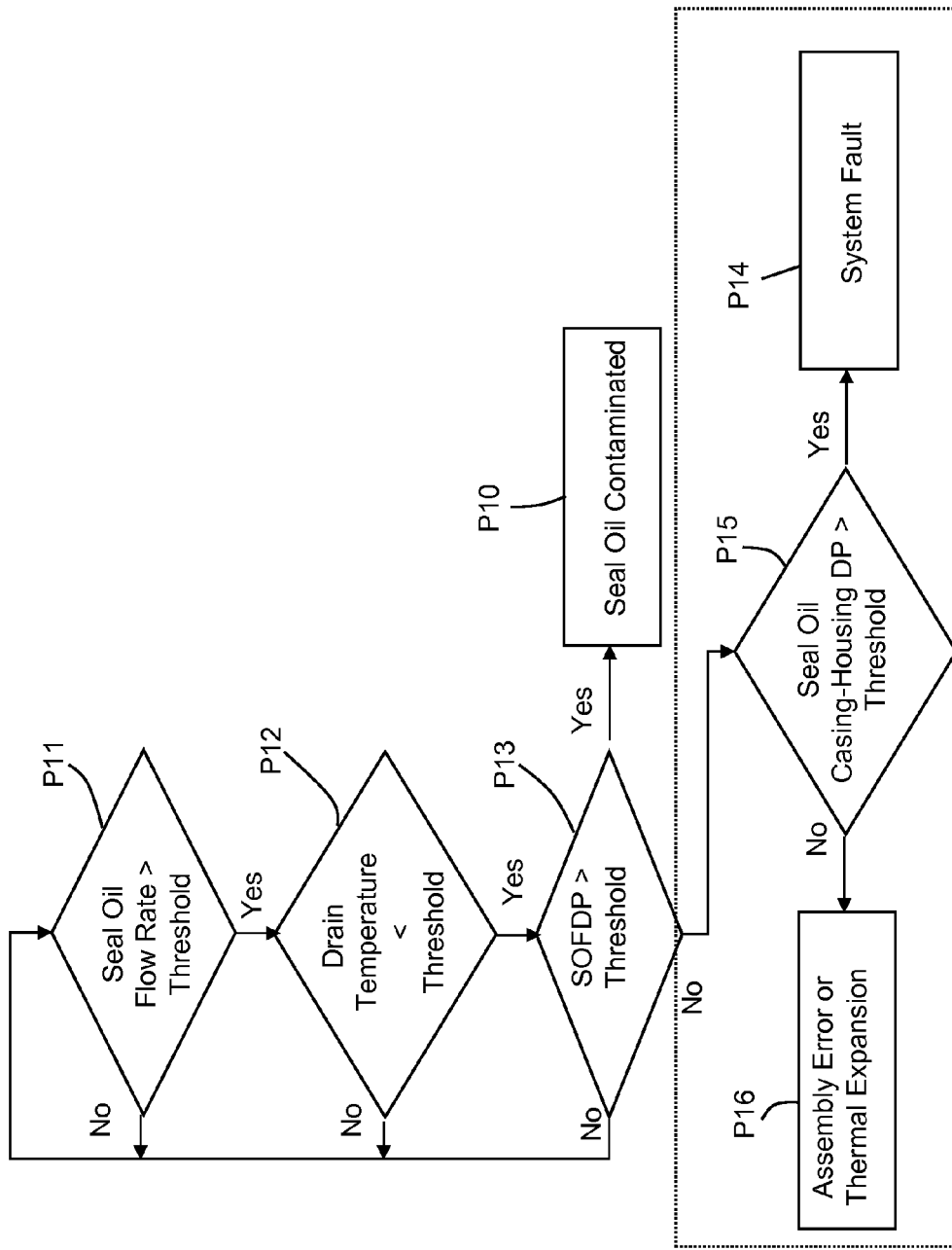
FIG. 3 shows a flow diagram of an operational methodology for another detector according to embodiments of the invention.

With reference to detectors 172 and 174, higher seal oil flow rates may be caused by numerous reasons such as increased clearance between shaft seal rings 122 and rotor 106 due to, e.g., thermal expansion, assembly error, seal oil contamination such as debris in the seal oil, seal eccentricity, or may be due to a faulty pressure regulator 150, etc. In order to determine the cause amongst this list, detectors 172 and 174 are provided. In one embodiment, as shown in FIG. 3, a seal oil contamination detector 172 generates an alarm (process P10) indicative of a contamination of seal oil 124. Detector 172 may generate the alarm in response to: the seal oil flow rate, as measured by seal oil sensor 146, exceeding a seal oil flow rate threshold (yes at process P11), the drain temperature, as measured by temperature sensor 144, being less than a drain temperature threshold (yes at process P12), and the seal oil filter differential pressure (SOFDP), as measured by seal oil differential pressure sensor 148, exceeding a seal oil filter pressure differential threshold (yes at process P13). The order of the processes may vary from that shown in FIG. 3. Each of the afore-mentioned thresholds may be user defined and have any appropriate known units of measure, and be based on, e.g., empirical data. In one embodiment, each of the above-stated thresholds may simply be the relatively steady state value at which system 100 had been operating prior to the onset of seal oil contamination. In any event, a seal oil flow rate increasing above a seal oil flow rate threshold indicates a sufficiently increased clearance between shaft seal rings 122 and rotor 106. A low drain temperature of seal oil 124 is also indicative of an increased clearance since there is less friction-created heat created in seal oil 124. An increased seal oil filter differential pressure (SOFDP), however, represents an increased amount of debris within seal oil 124 and, thus, is indicative of seal oil contamination.

In some cases, however, seal oil filter differential pressure may not have risen above a respective threshold, i.e., 'No' at process P13. In this case, in response to 'No' at process P13 returning processing to process P11, the flow proceeds to processes P14-P16 within the phantom box, i.e., the return to process P11 is removed. In this case, the reason for the increased clearance is probably not seal oil contamination. In order to further determine the cause, as also shown in FIG. 3, in an alternative embodiment, a problem detector 174 may generate a first alarm indicative of a system fault (process P14) in response to: the seal oil flow rate exceeding the seal oil flow rate threshold (yes at process P11), the drain temperature being less than the drain temperature threshold (yes at process P12), the seal oil filter differential pressure being less than the seal oil filter pressure differential threshold (no at process P13), and the seal oil casing-housing differential pressure, as measured by seal oil casing-housing differential pressure regulator 150, exceeding a seal oil casing-housing differential pressure threshold (yes at process P15). In this case, while the seal oil flow rate is high, the drain temperature is low and the seal oil filter pressure differential is not sufficiently high to indicate seal oil contamination, a higher seal oil casing-housing differential pressure indicates a system fault because all of the other possible causes have been eliminated. The system fault may take the form of, for example, a faulty pressure regulator 150 or a faulty threshold for one of the above thresholds.

Alternatively, problem detector 174 may generate a second alarm indicative of an assembly error or a thermal expansion (process P16) in response to the seal oil flow rate exceeding the seal oil flow rate threshold (yes at process P11), the drain temperature being less than the drain temperature threshold (yes at process P12), the seal oil filter differential pressure being less than the seal oil filter pressure differential threshold (no at process P13), and the seal oil casing-housing differential pressure being less than the seal oil casing-housing differential pressure threshold (no at process P15). In this case, the seal oil casing-housing differential pressure value being less than a threshold indicates that the increased clearance between shaft seal rings 122 and rotor 106 is due to either thermal expansion or an assembly error, i.e., because all of the other possible causes have been eliminated.

Figure 4:
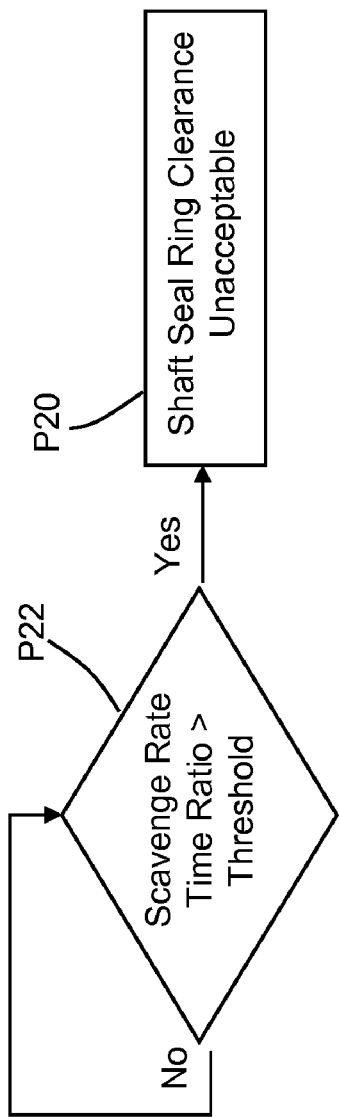
FIG. 4 shows a flow diagram of an operational methodology for another detector according to embodiments of the invention.
Figure 5:
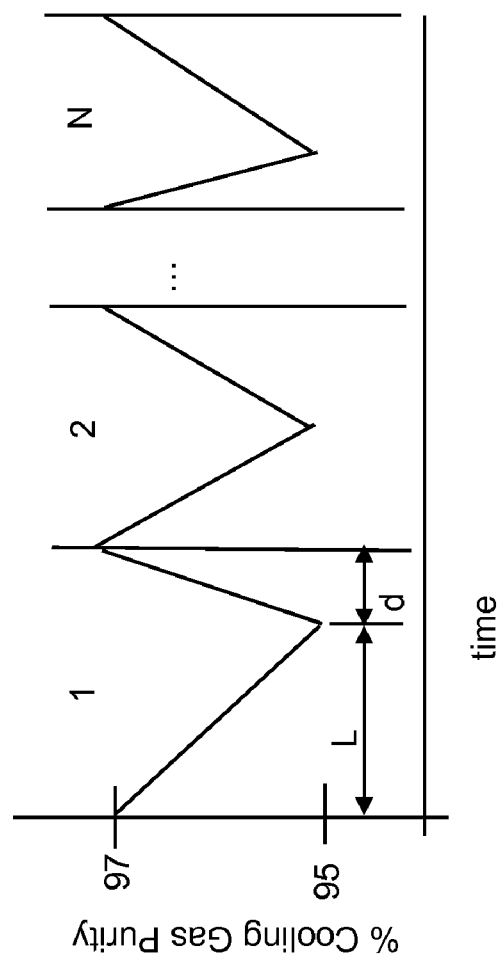
FIG. 5 shows a graph illustrating system operation detectable by the detector of FIG. 4.

Turning to FIGS. 4 and 5, in another embodiment, a seal ring clearance detector 176 generates an alarm indicative of an increased shaft seal ring clearance (process P20), i.e., relative to rotor 106, in response to a ratio of a time in which control valve system 134 operates at a first scavenge rate versus a second scavenge rate exceeding a scavenging rate ratio threshold. More specifically, control valve system 134 of scavenging system 130 operates at different scavenging rates, i.e., different gas mixture removal rates, which typically depend on the purity of gas mixture 132 in seal areas 123 as may be determined based on purity sensor 140. Where the purity is below a lower limit, scavenging system 130 operates at a high scavenge rate so as to remove the impure gas mixture 132 and force input of new pure cooling gas 103 by cooling gas regulator 110 under control of control system 112. In contrast, where the purity rises above a higher limit, scavenging system 130 returns to a lower scavenging rate because removal of impure cooling gas at a faster rate is not necessary. As shown in FIG. 5, as shaft seal ring 122 clearance increases gradually over time, the time period over which the purity decays from the upper limit to low limit (L) decreases. Similarly, the time period over which the purity is brought back from the low limit to upper limit (d) increases. For example, in a first cycle 1, the time (L) it takes for the purity of cooling gas 103 to decay from a high limit, e.g., 97%, to a lower limit, e.g., 95%, is relatively long compared to that at a later cycle N. At first cycle 1, seal system 121 is relatively new, so sufficient leakage to trigger a higher scavenging rate takes longer and the response time to increase the purity is shorter. The shorter time to trigger the higher scavenging rate in cycle N indicates a larger clearance for shaft seal rings 122 at the later time cycle N because cooling gas 103 is escaping faster. Similarly, the time (d) at which scavenging system 130 is at the higher scavenge rate becomes longer over time, as observed by comparing cycle 1 with cycle N, because it takes longer for control valve system 134 to make the purity increase to a sufficient level. Consequently, a ratio of a time in which control valve system 134 operates at a first, lower scavenge rate versus a second, higher scavenge rate provides an indication of shaft seal ring wear. A scavenging rate ratio threshold can be user defined, e.g., based on empirical data, to ascertain when shaft seal ring clearance is sufficiently large to warrant repair.

Although described as separate detectors 170, 172, 174 and 176, it is understood that any combination of the detectors may be employed within the scope of the invention.

Each alarm described herein may take a variety of forms such as an audible alarm, e.g., siren, beeping on a console, etc., or a visual alarm, e.g., flashing light on a console, a combination of the aforementioned, etc. The alarm may also include an instruction including a corrective action to at least partially correct the problem. For example, it may indicate something like: "seal oil contamination, replace seal oil," "shaft seal ring clearance above acceptable limit", etc. Alternatively, or in addition thereto, the instruction may provide specificity about where corrective action is required. For example, "shaft seal ring clearance above acceptable limit", "fault in casing-housing pressure differential threshold", etc. In addition, any data collected as described herein may also be evaluated or filtered in any known fashion to avoid faulty data that would bias the outcome, e.g., by determining whether the data is within an acceptable range, whether the data is realistic, whether the data is unstable, etc.

System 100, detectors 170, 172, 174 and 176, and the related sensors described are implementable in all gas cooled generators. Some advantages that may be realized in the practice of some embodiments of the described system 100 are higher generator performance, greater availability and lower operational cost. The problem of predicting high hydrogen consumption, hydrogen leakages and low hydrogen purities in generators will be solved by some embodiments of the invention. Also, the actual location of the cause of the problem may be revealed.

System 100 including detector(s) 170, 172, 174, 176 and the related sensors may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, system 100 and the detectors may take the form of a computer program product embodied in any tangible medium of expression having computer-usable program code embodied in the medium. In this case, the computer program instructions of system 100 may be loaded onto a computer or other programmable data processing apparatus, such as the overall control system 112 for electric generator 107, to cause a series of operational steps to be performed on the computer or other programmable apparatus to produce a computer implemented process such that the instructions which execute on the computer or other programmable apparatus provide processes for implementing the functions/acts specified herein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the generator's computer controller, partly on the controller, as a stand-alone software package, partly on the controller and partly on a remote computer or entirely on the remote computer or server. In the latter scenario, the remote computer may be connected to the generator's computer controller through any type of network, including a local area network (LAN) or a wide area network (WAN), or the connection may be made to an external computer (for example, through the Internet using an Internet Service Provider). The technical effect of the above-described embodiments of the invention is detection of, among other things, seal leakage(s) and/or seal oil contamination for a gas cooled generator. Detectors according to some embodiments of the invention provide means of early detection of cooling gas, e.g., hydrogen, leakage through leakage sources as well as low purity and high cooling gas consumption problems in a gas cooled generator.

The block diagrams and FIGS. illustrate the architecture, functionality, and operation of possible implementations of systems, methods and computer program products according to various embodiments of the present invention. In this regard, each stated function may represent a module, segment, or portion of code, which comprises one or more executable instructions for implementing the specified logical function(s). It should also be noted that, in some alternative implementations, the functions noted may occur out of the order stated. For example, two steps described in succession may, in fact, be executed substantially concurrently, or may sometimes be executed in the reverse order, depending upon the functionality involved. It will also be noted that functions described herein can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
    a casing for surrounding at least a portion of a rotor, and enclosing a volume of a cooling gas thereabout, the casing including a plurality of static seals;
    an end housing at each end of the casing, each end housing including a seal system through which the rotor extends, wherein a portion of the cooling gas escapes from the casing to at least one seal area within the end housing;
    a source of cooling gas fluidly coupled to the casing by a cooling gas regulator for delivering a flow of cooling gas to the casing to maintain a substantially constant pressure in the casing;
    a scavenging system coupled to each end housing for removing a gas mixture including a portion of escaping cooling gas;
    a purity sensor for determining a purity of the cooling gas in the casing; and
    a static seal leak detector that generates an alarm indicative of a leak in at least one of the plurality of static seals in response to at least one of:
    an increase in a cooling gas flow rate in the cooling gas regulator compared to a cooling gas flow rate threshold,
    an increase in a purity of the cooling gas in the casing compared to a respective purity threshold, and
    an increase in a gas mixture flow rate in the scavenging system compared to a gas mixture flow rate threshold.

2. The system of claim 1, wherein the source of cooling gas includes a pressurized tank of the cooling gas.

3. The system of claim 1, wherein the cooling gas includes hydrogen.

4. The system of claim 1, wherein the cooling gas flow rate and the purity are each a moving average.

5. The system of claim 1, further comprising:
a seal oil sensor for sensing a seal oil flow rate of a seal oil through at least one of the seal systems;
a temperature sensor for determining a drain temperature of the seal oil;
a pressure differential sensor for determining a seal oil filter differential pressure across a seal oil filter; and
a seal oil contamination detector that generates an alarm indicative of a contamination of the seal oil in response to the seal oil flow rate exceeding a seal oil flow rate threshold, the drain temperature being less than a drain temperature threshold and the seal oil filter differential pressure exceeding a seal oil filter pressure differential threshold.

6. The system of claim 5, further comprising a seal oil casing-housing differential pressure regulator for maintaining the seal oil differential pressure higher than a cooling gas pressure in the casing;
a problem detector that generates:
a first alarm indicative of a system fault in response to: the seal oil flow rate exceeding the seal oil flow rate threshold, the drain temperature being less than the drain temperature threshold, the seal oil filter differential pressure being less than the seal oil filter pressure differential threshold, and the seal oil casing-housing differential pressure exceeding a seal oil casing-housing differential pressure threshold, and
a second alarm indicative of an assembly error or a thermal expansion in response to the seal oil flow rate exceeding the seal oil flow rate threshold, the drain temperature being less than the drain temperature threshold, the seal oil filter differential pressure being less than the seal oil filter pressure differential threshold, and the seal oil casing-housing differential pressure being less than the seal oil casing-housing differential pressure threshold.

7. The system of claim 1, wherein the scavenging system includes a control valve system that removes the gas mixture at a first scavenge rate and at a second scavenge rate that is higher than the first scavenge rate, and
further comprising a seal system clearance detector that generates an alarm indicative of an increased clearance in a shaft seal ring in the seal system in response to a ratio of a time in which the control valve system operates at the first scavenge rate versus the second scavenge rate exceeding a scavenging rate ratio threshold.

8. A system comprising:
a casing for surrounding at least a portion of a rotor, and enclosing a volume of a cooling gas thereabout;
an end housing at each end of the casing, each end housing including a seal system through which the rotor extends, wherein a portion of cooling gas escapes from the casing to at least one seal area within the end housing;
a scavenging system coupled to each end housing for removing a gas mixture including a portion of escaping cooling gas;
a seal oil sensor for sensing a seal oil flow rate of a seal oil through at least one of the seal systems from the casing to a respective seal area at a pressure higher than a pressure within the casing;
a temperature sensor for determining a drain temperature of the seal oil;
a pressure differential sensor for determining a seal oil filter differential pressure across a seal oil filter; and
a seal oil contamination detector that generates an alarm indicative of a contamination of the seal oil in response to the seal oil flow rate exceeding a seal oil flow rate threshold, the drain temperature being less than a drain temperature threshold and the seal oil filter differential pressure exceeding a seal oil filter pressure differential threshold.

9. The system of claim 8, further comprising a seal oil casing-housing differential pressure regulator for maintaining a seal oil casing-housing differential pressure between the casing and each seal area;
a problem detector that generates:
a first alarm indicative of a system fault in response to: the seal oil flow rate exceeding the seal oil flow rate threshold, the drain temperature being less than the drain temperature threshold, the seal oil filter differential pressure being less than the seal oil filter pressure differential threshold, and the seal oil casing-housing differential pressure exceeding a seal oil casing-housing differential pressure threshold, and
a second alarm indicative of an assembly error or a thermal expansion in response to the seal oil flow rate exceeding the seal oil flow rate threshold, the drain temperature being less than the drain temperature threshold, the seal oil filter differential pressure being less than the seal oil filter pressure differential threshold, and the seal oil casing-housing differential pressure being less than the seal oil casing-housing differential pressure threshold.

10. The system of claim 8, wherein the casing includes a plurality of static seals, and further comprising:
a source of cooling gas fluidly coupled to the casing by a cooling gas regulator for delivering a flow of the cooling gas to the casing to maintain a substantially constant pressure in the casing;
a purity sensor for determining a purity of the cooling gas in the casing; and
a static seal leak detector that generates an alarm indicative of a leak in at least one of the plurality of static seals in response to at least one:
an increase in a cooling gas flow rate in the cooling gas regulator compared to a cooling gas flow rate threshold,
an increase in a purity of the cooling gas in the casing compared to a purity threshold, and
an increase in a gas mixture flow rate in the scavenging system compared to a gas mixture flow rate threshold.

11. The system of claim 10, wherein the cooling gas flow rate and the purity are each a moving average.

12. The system of claim 10, further comprising a seal oil casing-housing differential pressure regulator for maintaining a seal oil differential pressure between the casing an each end housing;
a problem detector that generates:
a first alarm indicative of a system fault in response to: the seal oil flow rate exceeding the seal oil flow rate threshold, the drain temperature being less than the drain temperature threshold, the seal oil filter differential pressure being less than the seal oil filter pressure differential threshold, and the seal oil casing-housing differential pressure exceeding a seal oil differential pressure threshold, and
a second alarm indicative of an assembly error or a thermal expansion in response to the seal oil flow rate exceeding the seal oil flow rate threshold, the drain temperature being less than the drain temperature threshold, the seal oil filter differential pressure being less than the seal oil filter pressure differential threshold, and the seal oil cashing-housing differential pressure being less than the seal oil casing-housing differential pressure threshold.

13. The system of claim 10, wherein the scavenging system includes a control valve system that removes the gas mixture at a first scavenge rate and at a second scavenge rate that is lower than the first scavenge rate, and further comprising a seal system clearance detector that generates an alarm indicative of an increased clearance in a shaft seal ring the seal system in response to a ratio of a time in which the control valve system operates at the first scavenge rate versus the second scavenge rate exceeding a scavenging rate ratio threshold.

14. The system of claim 8, wherein the source of cooling gas includes a pressurized tank of the cooling gas.

15. The system of claim 8, wherein the cooling gas includes hydrogen.

16. A system comprising:

a casing for surrounding at least a portion of a rotor and enclosing a volume of a cooling gas thereabout;

an end housing at each end of the casing, each end housing including a seal system including a shaft seal ring through which the rotor extends, wherein a portion of cooling gas escapes from the casing to at least one seal area via a respective shaft seal ring;

a scavenging system coupled to each end housing for removing a gas mixture including at least a part of the portion of escaping cooling gas, the scavenging system including a control valve system that removes the gas mixture at a first scavenge rate and at a second scavenge rate that is higher than the first scavenge rate; and a seal system clearance increase detector that generates an alarm indicative of an increased clearance in a shaft seal ring in response to a ratio of a time in which the control valve system operates at the first scavenge rate versus the second scavenge rate exceeding a scavenging rate ratio threshold.

17. The system of claim 16, further comprising:

a source of cooling gas fluidly coupled to the casing by a cooling gas regulator for delivering a flow of the cooling gas to the casing to maintain a substantially constant pressure in the casing;

a purity sensor for determining a purity of the cooling gas in the casing;

a static seal leak detector that generates an alarm indicative of a leak in at least one of a plurality of static seals in the casing in response to at least one of:

an increase in a cooling gas flow rate in the cooling gas regulator compared to a flow rate threshold, an increase in a purity of the cooling gas in the casing compared to a purity threshold, and an increase in a gas mixture flow rate in the scavenging system compared to a gas mixture flow rate threshold.

18. The system of claim 16, wherein the source of cooling gas includes a pressurized tank of the cooling gas.

19. The system of claim 16, wherein the cooling gas includes hydrogen.

* * * * *